Feb. 1, 1938.  F. O. CHURCH  2,107,052
SEAT CONSTRUCTION
Filed April 25, 1936   2 Sheets-Sheet 2
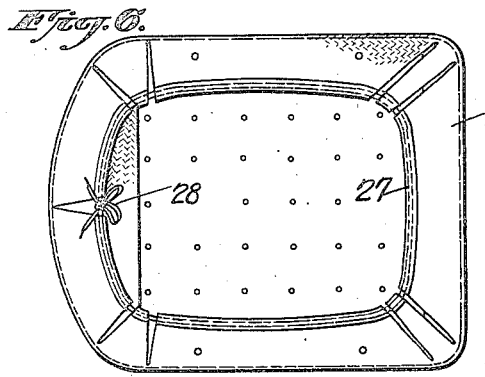
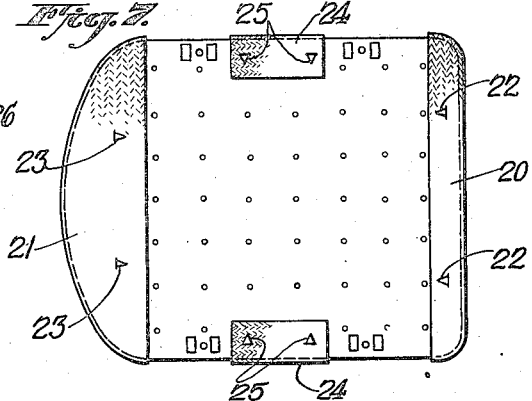
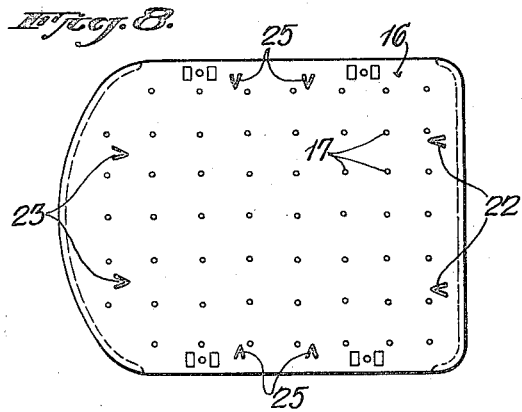
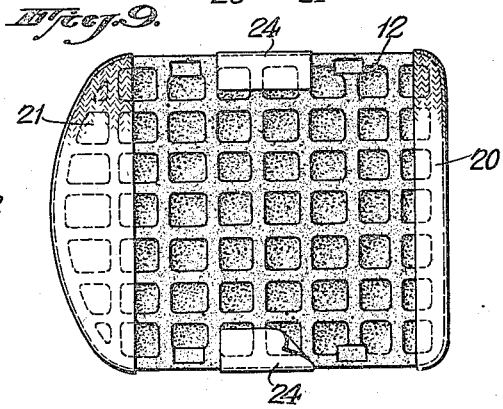
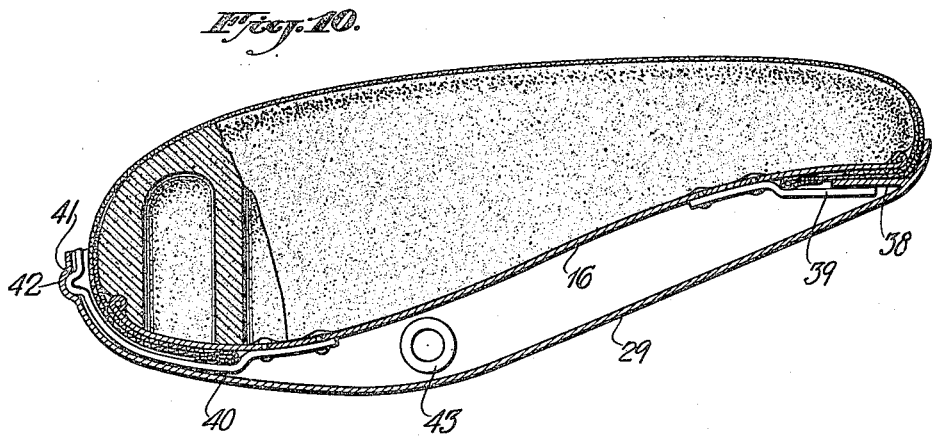
INVENTOR.
FRANKLIN O. CHURCH.
BY
ATTORNEYS Patented Feb. 1, 1938

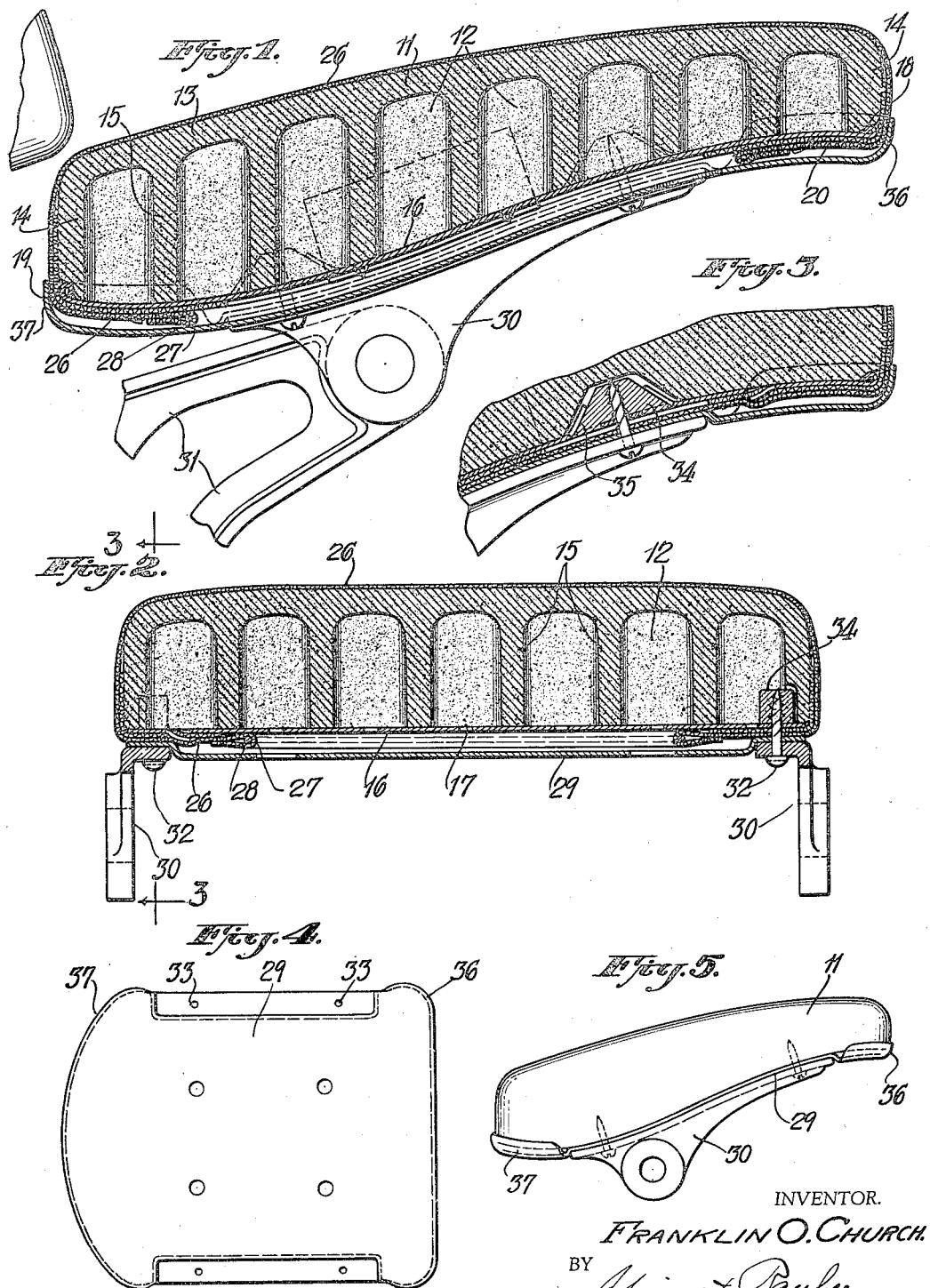

2,107,052

UNITED STATES PATENT OFFICE 2,107,052

SEAT CONSTRUCTION

Franklin O. Church, Buffalo, N. Y., assignor to Dunlop Tire and Rubber Corporation, Buffalo, N. Y., a corporation of New York Application April 25, 1936, Serial No. 76,313

8 Claims. (Cl. 155—179)

My present invention relates to upholstered seats, more particularly to seats having a cushioning element of cellular rubber or similar resilient material, and is particularly adapted for theatre seats.

The invention provides a construction that permits the resilient cushioning element to be secured directly to a base and yet permits the element to be readily disengaged from the base for replacement or repair. A cover is provided that may be readily removed for replacement, or cleaning and replaced without disturbing the cushioning element.

An embodiment illustrating the various features of the invention is shown in the accompanying drawings, in which—

Fig. 1 is a vertical section taken on a plane extending from front to back of a theatre seat embodying the invention.

Fig. 2 is a vertical section of the seat taken on a plane at right angles to that of Fig. 1.

Fig. 3 is a detail vertical section taken on the line 3—3 of Fig. 1.

Fig. 4 is a bottom plan view of a supporting pan or element forming a finishing panel for the seat.

Fig. 5 is a side view of a seat embodying the invention.

Fig. 6 is a bottom plan view of the completed seat with a cover in position thereon.

Fig. 7 is a bottom plan view of a supporting base and the cushioning element in assembled position.

Fig. 8 is a bottom plan view of the supporting plate or base.

Fig. 9 is a bottom plan view of the cushioning element, and

Fig. 10 is a vertical sectional view similar to that of Fig. 1, of a modified form of embodiment of the invention.

In the accompanying drawings the invention is illustrated as applied to the mounting of a cushioning element of cellular rubber, such as foamed latex rubber, for which purpose the invention is particularly suited but to which the invention is not limited. In this construction a supporting base is provided upon which the bottom of the cushioning element rests directly. The cushioning element has secured at its front and rear ends pockets into which the front and rear ends of the supporting base are respectively inserted and secured. Flaps are also provided at the sides of the cushioning element to fold under and be secured to the lower face of the supporting plate. A cover of any suitable fabric made to fit the outer surface of the cushioning element is then placed on the cushioning element, drawn underneath the supporting plate and tied or secured in position. The entire structure may then be mounted on a pan or frame which may be supported on rotatable brackets for use in theatres or auditoriums, etc., or may be mounted on legs or stands.

Referring more particularly to the accompanying drawings, the invention is shown as applied to a cushioning element 11 of cellular rubber having recesses 12 extending upwardly from its lower face to form a top slab or wall 13, side walls 14 and intersecting interior partition walls 15. This cushioning element is placed on a supporting base 16 preferably having vent openings 17 to permit free escape and entrance of air from the recesses 15 as the latter are compressed and released. The forward and rear edges 18 and 19, respectively, of the supporting base are turned to present a smooth rounded surface. These edges also follow the front and rear edge shapes of the cushioning element.

The cushioning element is secured at its front portion to the base 16 by a pocket 20 cemented to the cushioning element as, for example, at the front face or edge thereof, and extending downwardly and thence underneath the entire front edge of the base. A similar pocket 21 is formed at the rear of the cushioning element by a fabric similarly cemented to the cushioning element.

In assembling the cushioning element and its supporting base, the base is inserted in one of the pockets as, for example, the rear pocket and then the cushioning element is stretched until the other pocket will slip over the opposite end of the base. Upon releasing the cushioning element it will thereupon slide into its proper position with the opposite ends of the base projecting into the opposite pockets. Clips 22 and 23, respectively, are pressed downwardly from the supporting base so that the fabric of the pocket may be engaged thereby and held in position by bending the clips back into shape. The sides of the cushioning element may be secured also to the supporting base by side fabric flaps 24 cemented to the sides of the cushioning element and engaged by clips 25 struck outwardly from the base 16.

Through the above construction the cushioning element may be securely fastened and held in place on the supporting base and readily removed therefrom by loosening the clips 22, 23 and 25 and releasing the flaps and pockets 24, 20 and 21.

A cover 26 is provided to extend smoothly over the upper surface of the cushioning element 11.

thence downwardly over the sides and inwardly underneath the base 16. This cover is preferably tailored to fit the upper and side surfaces of the cushioning element. A hem 27 is formed on its lower edge and this hem is provided with a drawstring 28 so that the lower edge of the cover may be drawn inwardly and secured tightly by the drawstring. Instead of a drawstring that may be tied, the edges of the cover may be secured by a stretchable rubber or other elastic band fitted in the hem of the cover, or by strings laced across the bottom of the base from one edge of the cover to the opposite edge.

The assembled base, cushioning element and cover are then mounted on a supporting pan or bottom 29 which is pivotally supported by side brackets 30 on seat supports 31. The cushion base 16 is secured at its opposite side edges onto the side edges of the bottom pan 29 which are preferably slightly raised by means of screws 32 that extend upwardly through openings 33 in the pan 29, and through openings 17 in the base 16 to wooden inserts 34 mounted in recesses 35 in the base 16, the cushioning element having similar recesses to fit the inserts. The bottom pan 29 is preferably turned upwardly as at 36 and 37 at its front and rear edges, respectively, to cover the edges of the supporting base 16 and the lower corner of the cushioning element and provide a smooth finished assembly.

Instead of the construction shown in Figs. 1 to 9, inclusive, the securing means shown in Fig. 10 may be employed. In this assembly the construction of the cushioning element, base and cover may be the same as in Figs. 1 to 9, inclusive. The front end of the base 16, however, rests upon a shelf 38 projecting rearwardly from the front edge of the supporting pan 29, and the base 16 is provided with forwardly projecting plates 39 which engage the lower face of the shelf 38 when a forward edge of the cushion and its base are placed on the shelf 38 and then pushed forwardly. This locks the front end of the cushion securely onto the supporting pan or bottom 29. At its rear portion the base 16 is provided with a spring extension 40 which rests or is supported on the rear face of the pan 29, and is provided with a ridge 41 that fits into a horizontal recess 42 in the pan 29. To assemble the base and cushioning element onto the pan it is, therefore, merely necessary to rest the forward edge on the shelf 38, then to push the assembled base and cushion forwardly and downwardly so that the plate 39 will lock underneath the shelf 38 and the catch 41 will snap into its recess 42. This figure also represents a different mounting for the pan 29, the brackets being dispensed with, and a pivoting support 43 passing through the side walls of a pan or base.

The invention has been illustrated by way of example as applied to a cushioning element in which the depth of the cushion is increased at those places where the weight to be supported is greatest. It may be applied equally well, however, to cushions of uniform thickness or to those that are thicker at the front than at the rear. The spacing of the recesses 12 is also shown merely by way of example, and it will be understood that other configurations and spacings may be employed. While it is particularly advantageous for mounting cushioning elements of resilient cellular material, it will be understood that the invention may be applied to mounting cushioning elements of other constructions. The invention provides a construction in which seats may be easily and quickly disassembled and taken apart so that the cushioning element and cover may be cleaned or replaced or, in case of breakage, the supporting base or other elements may be replaced. While in use, however, all of the elements are firmly and securely held in place.

What I claim is—

1. A seat construction which comprises a rigid supporting base, a cushion element of cellular resilient material mounted on said base, pockets on the under surface of said cushion element to receive the front and rear ends of said base, a cover element extending over said cushion element and downwardly underneath said base, means to draw said cover element tightly about said assembled base and cushion, a supporting pan supporting said base, said supporting pan having a supporting shelf extending rearwardly from its front edge, and a plate extending forwardly from said base to engage underneath said shelf.

2. A seat construction which comprises a rigid supporting base, a cushion element of cellular resilient material mounted on said base, pockets on the under surface of said cushion element to receive the front and rear ends of said base, a cover element extending over said cushion element and downwardly underneath said base, means to draw said cover element tightly about said assembled base and cushion, a supporting pan supporting said base, said supporting pan having a supporting shelf extending rearwardly from its front edge, a plate extending forwardly from said base to engage underneath said shelf, and a catch means to secure the rear part of said base sheet to said supporting pan.

3. A seat construction which comprises a thin rigid base, a cushion of porous, resilient and elastic material on the upper surface of said base and a pair of sheets of relatively inelastic flexible material, one sheet at each end of said base on the underside thereof and joined to said cushion at the side and end edges of said base to hold said cushion to the front and back edges and the side edges of said base adjacent to the front and back edges while permitting said cushion to be freed from said base when stretched lengthwise sufficiently to clear said sheets of material.

4. A seat construction which comprises a thin rigid base, a cushion of porous, resilient and elastic material on the upper surface of said base, sheets of material, one stretched tautly on the front and the other stretched tautly on the back marginal undersurfaces of the base and joined to said cushion at the end and side edges of said marginal undersurfaces to hold the cushion closely onto the edges of said marginal portions and to leave a free intermediate zone between the opposite free edges of said sheets.

5. A seat construction which comprises a thin rigid base, a cushion of porous, resilient and elastic material on the upper surface of said base and a pair of sheets of relatively inelastic flexible fabric one at each end of said base on the underside thereof and extending upwardly at the edges of said base to the side edges of said cushion and being cemented to said cushion, said fabrics holding said cushion closely to the edges of said base and permitting it to be lifted therefrom when stretched lengthwise to cause said fabrics to clear said base.

6. A seat construction which comprises a thin rigid base, a cushion of porous, resilient and elastic material on the upper surface of said base and a pair of sheets of relatively inelastic flexible material, one sheet at each end of said base on the underside thereof and joined to said cushion at the side and end edges of said base to hold said cushion to the front and back edges and the side edges of said base adjacent to the front and back edges while permitting said cushion to be freed from said base when stretched lengthwise sufficiently to clear said sheets of material, and flaps extending downwardly from the sides of said cushion to the undersurface of said base between the free edges of said flexible material and fastened to the undersurface of said base.

7. A seat construction which comprises a thin rigid base, a cushion of porous, resilient and elastic material on the upper surface of said base and a pair of sheets of relatively inelastic flexible material, one sheet at each end of said base on the underside thereof and joined to said cushion at the side and end edges of said base to hold said cushion to the front and back edges and the side edges of said base adjacent to the front and back edges while permitting said cushion to be freed from said base when stretched lengthwise sufficiently to clear said sheets of material, means for detachably mounting the assembled seat construction as a unit on a support.

8. A seat construction which comprises a thin rigid base, a cushion of porous, resilient and elastic material on the upper surface of said base and a pair of sheets of relatively inelastic flexible material, one sheet at each end of said base on the underside thereof and joined to said cushion at the side and end edges of said base to hold said cushion to the front and back edges and the side edges of said base adjacent to the front and back edges while permitting said cushion to be freed from said base when stretched lengthwise sufficiently to clear said sheets of material, a pivotal support and means for removably mounting said base and cushion on said support.

FRANKLIN O. CHURCH.